United States Patent [19]

Kapuscinski et al.

[11] Patent Number: 4,948,524

[45] Date of Patent: Aug. 14, 1990

[54] DISPERSANT ANTI-OXIDANT VI IMPROVER AND LUBRICATING OIL COMPOSITION CONTAINING SAME

[75] Inventors: Maria M. Kapuscinski, Carmel; Theodore E. Nalesnik, Wappinger Falls; Robert T. Biggs, Walden; Harry Chafetz, Glenham; Christopher S. Liu, Poughkeepsie, all of N.Y.

[73] Assignee: Texaco Inc., White Plains, N.Y.

[21] Appl. No.: 395,627

[22] Filed: Aug. 18, 1989

[51] Int. Cl.$^5$ ............... C10M 149/12; C08F 210/16
[52] U.S. Cl. ............... 252/51.5 R; 525/331.7; 525/332.1; 525/377
[58] Field of Search ............ 252/51.5 A, 51.5 R, 252/47; 525/331.7, 332.1, 377

[56] References Cited

U.S. PATENT DOCUMENTS 3,645,980  2/1972  Baker et al. .................. 525/377
3,793,252  2/1974  Corish et al. .................. 525/377
4,699,723  10/1987  Kapuscinski et al. .......... 252/47

FOREIGN PATENT DOCUMENTS 654281  12/1962  Canada ..................... 252/51.5 A
0002286  6/1979  European Pat. Off. .

Primary Examiner—William R. Dixon, Jr.
Assistant Examiner—E. McAvoy
Attorney, Agent, or Firm—Robert A. Kulason; James J. O'Loughlin

[57] ABSTRACT

An additive composition prepared by reacting a polymer prepared from ethylene and at least one $C_3$–$C_{10}$ alpha-monoolefin and optionally a polyene selected from non-conjugated dienes and trienes comprising from about 15 to 80 mole percent of ethylene from about 20 to 85 mole percent of said $C_3$–$C_{10}$ alpha-monoolefin and from about 0 to 15 mole percent of said polyene and having an average molecular weight ranging from about 5,000 to 500,000 with a nitrosodiphenylamine compound represented by the formula:

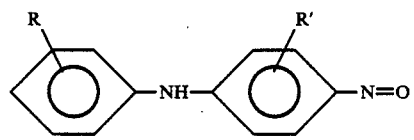

in which R and $R^1$ represent hydrogen or an alkyl, alkenyl, or alkoxyl radical having from 1 to 8 carbon atoms, and a lubricating oil composition containing same is provided.

21 Claims, No Drawings

DISPERSANT ANTI-OXIDANT VI IMPROVER AND LUBRICATING OIL COMPOSITION CONTAINING SAME

BACKGROUND OF THE INVENTION

This invention relates to a novel multi-functional lubricant additive which is a dispersant, anti-oxidant and a V. I. improver additive when employed in a lubricating oil composition.

DISCLOSURE STATEMENT

The art contains many teachings on the use of polymer additives in lubricating oil compositions. Ethylene-propylene copolymers and ethylene-alpha olefin non-conjugated diene terpolymers which have been further derivatized to provide bifunctional properties in lubricating oil compositions illustrate this type of oil additive.

U.S. Pat. No. 3,522,180 discloses a method for the preparation of an ethylene-propylene copolymer substrate effective as a viscosity index improver for lubricating oils.

U.S. Pat. No. 4,089,794 discloses ethylene copolymers derived from ethylene and one or more $C_3$ to $C_{28}$ alpha olefin solution grafted with an ethylenically-unsaturated carboxylic acid material followed by a reaction with a polyfunctional material reactive with carboxyl groups, such as a polyamine, a polyol, or a hydroxyamine which reaction product is useful as a sludge and varnish control additive in lubricating oils.

U.S. Pat. No. 4,137,185 discloses a stabilized imide graft of an ethylene copolymer additive for lubricants.

U.S. Pat. No. 4,146,489 discloses a graft copolymer where the backbone polymer is an oil-soluble ethylene-propylene copolymer or an ethylene-propylene-diene modified terpolymer with a graph monomer of C-vinyl-pyridine or N-vinylpyrrolidone to provide a dispersant VI improver for lubricating oils.

U.S. Pat. No. 4,320,019 discloses a multipurpose lubricating additive prepared by the reaction of an interpolymer of ethylene and a $C_3$-$C_8$ alpha-monoolefin with an olefinic carboxylic acid acylating agent to form an acylating reaction intermediate which is then reacted with an amine.

U.S. Pat. No. 4,340,689 discloses a process for grafting a functional organic group onto an ethylene copolymer or an ethylene-propylene-diene terpolymer.

U.S. Pat. No. 4,357,250 discloses a reaction product of a copolymer and an olefin carboxylic acid via the "ene" reaction followed by a reaction with a monoamine-polyamine mixture.

U.S. Pat. No. 4,382,007 discloses a dispersant - VI improver prepared by reacting a polyamine-derived dispersant with an oxidized ethylene-propylene polymer or an ethylene-propylene diene terpolymer.

U.S. Pat. No. 4,144,181 discloses polymer additives for fuels and lubricants comprising a grafted ethylene copolymer reacted with a polyamine, polyol or hydroxyamine and finally reacted with a alkaryl sulfonic acid.

The disclosures in the forgoing patents which relate to VI improvers and dispersants for lubricating oils, namely U.S. Pat. Nos. 3,522,180, 4,026,809, 4,089,794, 4,137,185, 4,144,181, 4,146,489, 4,320,019, 4,340,689, 4,357,250, and 4,382,007 are incorporated herein by reference.

An object of this invention is to provide a novel derivatized copolymer composition.

Another object is to provide a process for preparing a derivatized copolymer without the need for an acylating graft reaction. Still another object of the invention is to provide a multi-functional lubricant additive effective for imparting viscosity index, dispersancy and anti-oxidant properties to a lubricating oil composition.

A further object is to provide a novel lubricating oil composition containing the copolymer additive of the invention as well as to provide concentrates of the novel additive of invention.

SUMMARY OF THE INVENTION

The novel reaction product of the invention comprises an ethylene copolymer or terpolymer of a $C_3$ to $C_{10}$ alpha-monoolefin and optionally a non-conjugated diene or triene which has been reacted with a nitrosodiphenylamine compound represented by the formula:

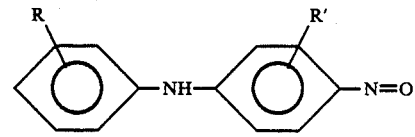

in which R and R' each represent hydrogen or an organic radical.

The novel lubricant of the invention comprises an oil of lubricating viscosity and an effective amount of the novel reaction product. The lubricating oil will be characterized by having viscosity index improver, dispersancy and anti-oxidant properties.

Concentrates of the reaction product of the invention as well as its method of preparation are also contemplated.

DETAILED DESCRIPTION OF THE INVENTION

The polymer or copolymer substrate employed in the novel additive of the invention may be prepared from ethylene and propylene or it may be prepared from ethylene and a higher olefin within the range of $C_3$ to $C_{10}$ alpha-monoolefins. It may employ a polymer prepared from isoprene or hydrogenated isoprene, as well as their copolymers with styrene.

More complex polymer substrates, often designated as interpolymers, may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bi-cyclo compounds. Representative dienes include 1,4-hexadiene, 1,4-cyclohexadiene, dicyclopentadiene, 5-ethylidene-2-norbornene, 5-methylene-2-norborene, 1,5-heptadiene, and 1,6-octadiene. A mixture of more than one diene can be used in the preparation of the interpolymer. A preferred non-conjugated diene for preparing a terpolymer or interpolymer substrate is 5-ethylidene-2-norbornene.

The triene component will have at least two non-conjugated double bonds, and up to about 30 carbon atoms in the chain. Typical trienes useful in preparing the interpolymer of the invention are 1-isopropylidene- 3a,4,7,7 a-tetrahydroindene, 1-isopropylidenedicyclopentadiene, dehydroiso-dicyclopentadiene, and 2-(2-methylene-4-methyl-3-pentenyl) [2.2.1]bicyclo-5-heptene.

The polymer and copolymers prepared from the above mentioned monomers having short and long branches or star shape structure may also be employed.

The polymerization reaction to form the polymer substrate is generally carried out in the presence of a catalyst in a solvent medium. The polymerization solvent may be any suitable inert organic solvent that is liquid under reaction conditions for solution polymerization of monoolefins which is generally conducted in the presence of a Ziegler type catalyst. Examples of satisfactory hydrocarbon solvents include straight chain paraffins having from 5–8 carbon atoms, with hexane being preferred. Aromatic hydrocarbons, preferably aromatic hydrocarbon having a single benzene nucleus, such as benzene, toluene and the like; and saturated cyclic hydrocarbons having boiling point ranges approximating those of the straight chain paraffinic hydrocarbons and aromatic hydrocarbons described above, are particularly suitable. The solvent selected may be a mixture of one or more of the foregoing hydrocarbons. It is desirable that the solvent be free of substances that will interfere with a Ziegler polymerization reaction.

In a typical preparation of a polymer substrate, hexane is first introduced into a reactor and the temperature in the reactor is raised moderately to about 30° C. Dry propylene is fed to the reactor until the pressure reaches about 40–45 inches of mercury. The pressure is then increased to about 60 inches of mercury and dry ethylene and 5-ethylidene-2-norbornene are fed to the reactor. The monomer feeds are stopped and a mixture of aluminum sesquichloride and vanadium oxytrichloride are added to initiate the polymerization reaction. Completion of the polymerization reaction is evidenced by a drop in the pressure in the reactor.

Ethylene-propylene or higher alpha monoolefin copolymers may consist of from about 15 to 85 mole percent ethylene and from about 15 to 85 mole percent propylene or higher monoolefin with the preferred mole ratios being from about 25 to 85 mole percent ethylene and from about 15 to 75 mole percent of a $C_3$ to $C_{10}$ alpha monoolefin with the most preferred proportions being from 20 to 55 mole percent ethylene and 45 to 75 mole percent propylene.

Terpolymer variations of the foregoing polymers may contain from about 0.1 to 10 mole percent of a non-conjugated diene or triene.

The polymer substrate, that is the ethylene copolymer or terpolymer is an oil-soluble, substantially linear, rubbery material having an average molecular weight from about 5,000 to 500,000 with a preferred molecular weight range of 25,000 to 250,000 and a most preferred range from about 50,000 to 150,000.

The terms polymer and copolymer are used generically to encompass ethylene copolymers, terpolymers or interpolymers. These materials may contain minor amounts of other olefinic monomers so long as their basic characteristics are not materially changed.

The ethylene copolymer backbase is reacted with a nitrosodiphenylamine compound represented by the formula:

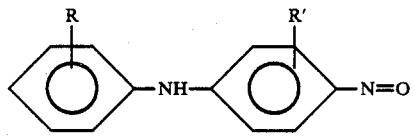

in which R and R' represent hydrogen or an organic radical having from 1 to 10 carbon atoms which may contain nitrogen, oxygen or sulfur atoms. A preferred nitrosodiphenylamine compound is one in which R and R' each represent hydrogen or an aliphatic hydrocarbon radical having from 1 to 5 carbon atoms. Examples of suitable nitrosodiphenylamine compounds include 4-nitrosodiphenylamine, 3-nitrosodiphenylamine, and 4-nitroso-2,3'- dimethyl-diphenylamine.

The nitrosodiphenylamine compound may be reacted with the polymer backbone in a number of ways. It may be reacted in a thermal process known as the "ene" process or by a reaction in solution or in solid form using a radical initiator. The free-radical induced reaction of materials in solvents, such as mineral oil is a preferred method. It is carried out at an elevated temperature in the range of about 100° C. to 250° C., preferably 120° to 190° C. and more preferably at 150° to 180° C., e.g. above 160° C., in a solvent, preferably a mineral lubricating oil solution containing, e.g. 1 to 50, preferably 5 to 30 wt. %, based on the initial total oil solution, of the ethylene polymer and preferably under an inert environment.

The free-radical initiators which may be used are peroxides, hydroperoxides, and azo compounds and preferably those which have a boiling point greater than about 100° C. and decompose thermally within the prescribed temperature range to provide free radicals. Representative of these free-radical initiators are dicumyl peroxide, 2,2'-azobis(2-methyl-N-[1,1 -bis (hydroxymethyl)ethyl]propionamide, di-tert-butylperoxide, azobisisobutyronitrile, diacetylperoxide, and diisopropylperoxidicarbonate. The initiator is used in an amount of between about 0.001% and about 30% by weight based on the weight of polymer. The reaction is preferably carried out in an inert atmosphere, such as under nitrogen blanketing.

The polymers used herein are substantially linear, hydrocarbon polymers. Typical are the oil soluble ethylene-propylene based copolymers, saturated and unsaturated containing 35 to 90 mole % ethylene units. This includes ethylene-propylene- copolymer (EPM) or diene terpolymers (EPDM) such as an ethylene propylene-1,4-hexadiene terpolymer or an 5-ethylene-2-norbornene terpolymer.

Polymer substrates or interpolymers are available commercially. Particularly useful are those containing from about 40 to about 80 mole percent ethylene units, about 60 to about 20 mole percent propylene units. Examples are "Ortholeum 2052" and "PL-1256" available from E.I. duPont deNemours and Co. The former is a terpolymer containing about 48 mole percent ethylene units, 48 mole percent propylene units and 4 mole percent 1,4-hexadiene units, having an inherent viscosity of 1.35. The latter is a similar polymer with an inherent viscosity of 1.95. The viscosity average molecular weights of the two are on the order of 200,000 and 280,000, respectively.

The process can be carried out in the following manners:

1. In the presence of free radical initiator in solution

A solution containing 10-30 parts of EPM or EPDM and 90-70 parts of solvent such as mineral oil or n-hexane is prepared. The stirred solution is heated at 80°-165° C. in the presence of nitrogen to form a homogeneous solution. 0.06-6 parts nitrosodiphenylamine (NDPA) and 0.03 to 6 parts of free radical initiator are charged. The mixture is heated with stirring at temperature above decomposition temperature of the initiator (under nitrogen) for 0.5-5 hours. Typically 20 parts of EPM, 80 parts of mineral low sulfur oil, 0.8 parts of NDPA and 0.16 parts of dicumyl peroxide are used. The reaction mixture is maintained at 155°+5° C. for, 2 hours.

2. Without free radical initiator in solution

A solution containing 10-30 parts of EPDM and 90-70 parts of solvent such as mineral oil or n-hexane is prepared. The stirred solution is heated at 150°-300° C., in the presence of nitrogen to form a homogenous solution. 0.06-6 parts nirosodiphenylamine (NDPA) is charged. The mixture is stirred at 150°-300° C. (under nitrogen) for 0.5-5 hours. Typically, 20 parts of EPDM, 80 parts of mineral low sulfur oil, and 0.8 parts of NDPA are used. The reaction mixture is maintained at 255°+−5° C. for 2 hours.

3. Using a Bramley-Beken Mixer (mastificated rubber without initiator)

20-200 g of EPDM is charged to the Bramley-Beken Mixer. The rubber is ground at room temperature and then heated with stirring at temperature 140°-190° C. under nitrogen. 0.1-60 parts of NDPA is charged and the mixture is stirred at the above temperature for 0.5-4 hours.

To the product prepared by methods 1, 2 or 3, enough mineral oil is added to obtain a fluid concentrate at room temperature (6 −14 wt % polymer solution). The fluid solution (a lubricant additive) is used for further testing.

It is a feature of this invention that the so-prepared graft polymers may find use in lubricating oils as dispersant/antioxidant and viscosity index improvers when present in effective amount of 0.4-5 w %, preferable 0.6-3 w %, say 0.9 w % (2-20 w % of polymer concentrate, VI improver, preferably 8-15 w %).

Lubricating oils in which the dispersant/antioxidant index improvers of this invention may find use may include automotive, aircraft, marine, railway, etc. oils; oils used in spark ignition or compression ignition; summer or winter oils; etc. Typically the lubricating oils may be characterized by an ibp of 570 F-660 F, say 610 F; an ep of 750 F-1200 F, say 1020 F; and a API gravity of 25-31, say 29.

A typical lubricating oil in which the VI improver of this invention may be present may be a standard SAE 5W-30 hydrocarbon motor oil formulation having the following composition:

TABLE

| | W % |
|---|---|
| Base Oil | 82 |
| - Viscosity Index Improver | 9 |
| (10 W % ethylene-propylene copolymer in 90% inert oil) | |
| - Standard Additive Package | 9 |
| polyisobutenyl Mn 1290 succinimide (dispersant and anti-wear); | |
| calcium sulfonate (detergent); | |
| Zinc dithiophosphate (anti-wear); | |
| di-nonyl diphenyl amine (anti-oxidant); | |
| 4,4-methylene-bis (2,6-di-t-butyl phenol) | |

TABLE-continued

| | W % |
|---|---|
| (anti-wear); | |

Use of the additive of this invention makes it possible to readily increase the viscosity index by 25-40 units, say 35 units and to obtain improved ratings on the tests measuring the dispersancy of the system. The viscosity index is determined by ASTM Test D-445.

Antioxidancy is measured by the Bench Oxidation Test (BOT). The sample is heated while air is passed through the mixture. Samples are withdrawn periodically and analyzed by DIR Differential Infrared Analysis to observe changes in the intensity of the carbonyl group vibration at $1710/cm^{-1}$. A higher intensity indicates lower thermal oxidation stability. The Oxidation Index (OI) is reported as the change in intensity after 144 hours.

Dispersancy is determined by the Bench VC Test (BVCT). In this test, the turbidity of an oil containing an additive is measured after heating the test oil to which has been added a standard blow-by. The result correlates with dispersancy and is compared to three standards (Good, Fair, and Poor) tested simultaneously with the test sample. The numerical rating decreases with an increase in dispersant effectiveness. Results above 90 indicate that the additive does not provide dispersant activity.

Grafting yield of grafted monomer is determined by IR-analysis of isolated rubber. Changes in the aromatic band at $1600 \ cm^{-1}$ compared to the ungrafted rubber band at $722 \ cm^{-1}$ are examined. The rubber is isolated from solution by multiple dissolvation/precipitation using cyclohexane as a solvent and acetone as precipitator. Then the rubber is dried in vacuum at 60 C for 36 hours.

The product of invention is evaluated in the Sequence VE Engine Test. The Sequence VE test procedure is designed to evaluate the propensity of crankcase motor oils to prevent sludge and varnish deposits and engine wear.

The test utilizes a Ford 2.3 liter inline four cylinder engine. This engine features an overhead camshaft, electronic fuel injection, hydraulic valve clearance adjustment, and a high compression, fast burn combustion chamber design. The engine fueled with Phillips "J" Fuel, a non-detergent, unleaded reference gasoline.

The test is comprised of three distinct stages. Together, the three stages comprise one cycle. Each cycle lasts four hours (240 minutes) and is repeated 72 times, for a total of 288 hours. During Stage I, the engine is operated at moderate speed and load and moderate oil and water temperatures for 120 minutes. During Stage II, the engine is operated for 75 minutes at the same slightly "leaner" (excess air) than stoichiometric in Stages I and II. During Stage III, the engine is operated for 45 minutes at low speed and load and low oil and water temperatures. The air-fuel ratio is "richer" (excess fuel) than stoichiometric in Stage III.

The test has been set up to provide repeatable, relatively fast accumulation of deposits and wear. To accelerate wear and deposit formation, the engine is not operated in the same manner as in an automobile. As an example, the combustion blowby into the crankcase and NOx (oxides of nitrogen) concentration in the exhaust are operated at significantly elevated levels. In addition, the environment under the rocker arm cover is controlled by circulating coolant through a jacket surrounding the rocker arm cover. Along with the temperatures and air-fuel ratios noted above, these items promote the formation of sludge and varnish deposits and engine wear.

At the conclusion of the test, the engine is completely disassembled to determine the levels of sludge and varnish deposits and engine wear that have accumulated.

The following examples illustrate the preparation of the novel additive of the invention. All parts are parts by weight unless otherwise set forth. Control examples are designated by an asterisk.

EXAMPLE 1

In this example nitrosodiphenylamine is grafted onto EPM containing around 0.3 mole % of 5-ethylidene-2-norbornene (extruded EPsyn 4106) in presence of free radical initiator, dicumyl peroxide. EPM (Mn=80,000 as measured by SEC) containing approximately 60 mol % of ethylene is used. 100. parts of EPM dissolved in 400 parts of mineral grafting oil (SUN-148) is heated to 155° C. (with stirring under nitrogen). 4.0 parts by weight of NDPA dissolved in 4.0 w.parts of toluene is added followed by 0 8 w. parts dicumyl peroxide dissolved in 2.4 w. parts of oil. The mixture is stirred using above conditions for 2 hours, allowing toluene to be evaporated.

Solvent neutral oil (SNO-100) is added to give an oil solution containing 12.5 wt % polymer.

EXAMPLE 2

The procedure of Example 1 is followed except that 2,2'-azobis(2-methyl-N-[1,1 -bis (hydroxymethyl)ethyl]-propionamide, is used as a free radical initiator.

EXAMPLE 3

The procedure of Example 1 is followed except that a lower polymer concentration (12.5 wt % instead of 20 wt %) solution in a mixture of grafting oil and SNO-100 and no free radical are used.

EXAMPLE 4

The procedure of Example 1 is used except that EPDM (Ortholeum 2055) instead of EPM (extruded EPsyn 4106) is used.

EXAMPLE 5

The procedure of Example 4 is followed except that no free radical initiator was charged.

EXAMPLE 6

The procedure of Example 5 is followed except that the lower polymer concentration (9.0 wt % instead of 20wt %) in a mixture of grafting oil and SNO-100 and 2 parts by weight of NDPA dissolved in 2.0 wt parts of toluene were used.

EXAMPLE 7

The reaction was performed in laboratory Bramley-Beken Mixer. 100 parts of EPDM (Ortholeum 2052) was charged to the mixer. The rubber is ground for 30 minutes and heated with stirring under nitrogen to about 160° C. Two parts of NDPA is charged and the mixture is stirred at 160° C. under air for 60 minutes. Then the mixture is cooled to room temperature under nitrogen and discharged from the mixer. Solvent neutral oil (SNO-100) is added to give a final product as described in the Example 1.

EXAMPLE 8

The procedure of Example 4 is followed except that EPM (Mn=130,000 as measured by SEC) is used.

EXAMPLE 9

The procedure of Example 1 is followed except that no free radical initiator is charged.

EXAMPLE 10*

12.5 wt % EPM solution in mineral oil is prepared. 100 parts of EPM which is used in the Example 1 is added to 400 parts of SUN-148 and 300 parts of SNO-100. The mixture is heated to 155° C. with stirring and under nitrogen for 3 hours until the rubber is completely dissolved.

EXAMPLE 11*

Four parts by weight of NDPA per 100 parts of rubber is admixed to the solution containing 8.6 of sample 10* in SNO-130. The sample is tested by the Bench Oxidation Test without additional dilution.

EXAMPLE 12*

The procedure of Example 10 is followed except that Ortholeum 2052 instead of EPM is used and 611 parts instead of 300 parts of SNO-100 is added.

EXAMPLE 13*

The procedure of Example 11* is followed except that the sample of the example 12* instead of the Example 10* is used.

TABLE 1

| SAMPLE | Properties of VI Improvers | | | | | | |
|---|---|---|---|---|---|---|---|
| | 1 | 2 | 3 | 4 | 5 | 6 | 7 |
| MATERIAL wt parts | | | | | | | |
| EPM (0.3 diene) | 100 | 100 | 100 | — | — | — | — |
| ORTHOLEUM 2052 | — | — | — | 100 | 100 | 100 | 100 |
| NDPA | 4.0 | 4.0 | 4.0 | 4.0 | 4.0 | 2.0 | 2.0 |
| DICUP | 0.8 | — | — | 0.8 | — | — | — |
| VA-82 | — | 0.8 | — | — | — | — | — |
| Grafting oil | 295.2 | 295.2 | 296.0 | 295.2 | 296.0 | 298.0 | |
| Diluent oil | 400.0 | 400.0 | 400.0 | 711.11 | 711.11 | 711.11 | 1009.11 |
| POLYMER CONCENTRATION DURING GRAFTING | 20.0 | 20.0 | 12.5 | 20.0 | 20.0 | 9.0 | 100 |
| POLYMER CONCENTRATION IN FINAL PRODUCT | 12.5 | 12.5 | 12.5 | 9.0 | 9.0 | 9.0 | 9.0 |
| IR SPECTRA 1600/722 cm −1 (band heights ratio) | .54 | .33 | .34 | .34 | .34 | .18 | .87 |
| OXIDATION INDEX (1) | 2.0 | — | 0.2 | 0.6 | 0.1 | 0.5 | 0.3 |

TABLE 1-continued

| | Properties of VI Improvers | | | | | | |
|---|---|---|---|---|---|---|---|
| SAMPLE | 1 | 2 | 3 | 4 | 5 | 6 | 7 |
| BENCH DISPERSANCY (2) | | | | | | | |
| Result | 53 | 59 | 70 | 57 | 66 | 77 | 79 |
| Standards | | 24/26/55 | | | | | |
| VISCOSITY INDEX | 153 | 152 | 152 | 157 | 152 | — | — |

(1) Change in the intensity of the carbonyl group IR vibration at 1710 cm $-1$ after 144 hours in BOT
(2) As measured by Bench VC Test

TABLE 2

| | Properties of VI Improvers | | | | | |
|---|---|---|---|---|---|---|
| SAMPLE | 8 | 9 | 10* | 11* | 12* | 13* |
| MATERIAL wt parts | | | | | | |
| EPM (0.3 diene) | — | — | 100 | 100 | — | — |
| ORTHOLEUM 2052 | — | — | — | — | 100 | 100 |
| EPM | 100 | 100 | — | — | — | — |
| NDPA | 4.0 | 4.0 | — | 4.0 | — | 4.0 |
| DICUP | 0.8 | — | — | — | — | — |
| VA-082 | — | — | — | — | — | — |
| Grafting oil | 295.2 | 296.0 | 296.0 | 296.0 | 296.0 | 296.0 |
| Diluent oil | 711.11 | 711.11 | 404.0 | 400.0 | 717.11 | 713.11 |
| POLYMER CONCENTRATION DURING GRAFTING | 20.0 | 20.0 | | no grafting | | |
| POLYMER CONCENTRATION IN FINAL PRODUCT | 9.0 | 9.0 | 12.5 | 12.5 | 9.0 | 9.0 |
| IR SPECTRA 1600/722 cm $-1$ (band heights ratio) | .19 | .14 | 0.0 | 0.0 | 0.0 | 0.0 |
| OXIDATION INDEX (1) | 0.5 | 0.0 | 22 | 0.5 | 10 | 0.3 |
| BENCH DISPERSANCY (2) | | | | | | |
| Result | 85 | 93 | 92 | 93 | 92 | 91 |
| Standards | 24/26/55 | | | | | |
| VISCOSITY INDEX | 162 | 153 | 152 | 150 | 157 | — |

(1) Change in the intensity of the carbonyl group IR vibration at 1710 cm $-1$ after 144 hours in BOT
(2) As measured by Bench VC Test

| SEQUENCE V-E ENGINE TEST COMPARISONS 5W-30 PROTOTYPE SG FORMULATIONS | | | | | |
|---|---|---|---|---|---|
| VI IMPROVER | | | | | |
| DI PKG (TEXACO) | | ← A → | | | |
| SAMPLE 1 (DAOCP) | 9.50 | | | | |
| PARATONE 815 | | 8.00 | | | |
| PARATONE 855 | | | 9.10 | | |
| TLA-656 (DOCP) | | | | 8.00 | |
| SEQUENCE V-E | | | | | SG LIMITS |
| R/A SLUDGE | 8.98 | 4.1 | 8.9 | 5.8 | 7.0 MIN |
| AVG SLUDGE | 9.20 | 4.2 | 7.1 | 6.4 | 9.0 MIN |
| PSV | 7.17 | 7.3 | 7.2 | 7.0 | 6.5 MIN |
| AVG VARNISH | 6.22 | 6.1 | 6.4 | 5.2 | 5.0 MIN |
| OIL RING CLOGGING, % | 0 | 23.8 | 0 | 35 | 15.0 MAX |
| OIL SCREEN CLOGGING, % | 0 | 100 | 90 | 78 | 20.0 MAX |
| OIL SCREEN CLOGGING, % (OTHER THAN SLUDGE) | 0 | 3 | 5 | 22 | — |
| CAM WEAR, mils, MAX | 10.3 | 20.0 | 12.3 | 19.2 | 15.0 MAX |
| AVG | 5.0 | 7.7 | 8.9 | 4.8 | 5.0 MAX |

V. RESULTS

The evaluation data for the samples of Examples 1–13 are listed in Tables 1 and 2. The sample numbers are related to the example numbers.

As seen in the Tables 1 and 2, samples of Examples 1–8 containing rubber grafted with nitrosodiphenylamine (IR spectra show large bands at 1600 cm$^{-1}$) show dispersant and antioxidant activity. Sample of Example 9, where EPM not containing any unsaturation and no free radical initiator are used, shows very low grafting level of NDPA and provides antioxidant activity only. The reference samples of Examples 10, 12 containing unmodified rubber show neither dispersant or antioxidant activity. Samples 11* and 13* containing a mixture of rubber and nitrosoamine show antioxidant activity but do not provide any dispersancy.

Sample 1, showed significantly better performance in Seq. V-E Engine Test than a commercial DOCP VI improver or competitive additives.

The above data indicate that when EPM or EPDM polymers are grafted with nitroso diphenylamine; multifunctional VI improvers exhibiting dispersant and antioxidant activity are produced.

What is claimed is:

1. An additive composition prepared by reacting a polymer prepared from ethylene and at least one $C_3$-$C_{10}$ alpha-monoolefin and optionally a polyene selected from non-conjugated dienes and trienes comprising from about 15 to 80 mole percent of ethylene from about 20 to 85 mole percent of said $C_3$-$C_{10}$ alpha-monoolefin and from about 0 to 15 mole percent of said polyene and having an average molecular weight ranging from about 5,000 to 500,000 with a nitrosodiphenylamine compound represented by the formula:

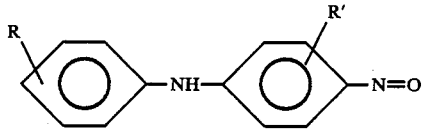

in which R and $R^1$ represent hydrogen or an alkyl, alkenyl, or alkoxyl radical having from 1 to 8 carbon atoms.

2. A composition according to claim 1 in which said polymer has a number average molecular weight from about 25,000 to 250,000.

3. A composition according to claim 1 in which said polymer has a number average molecular weight from about 50,000 to 150,000.

4. A composition according to claim 1 in which said polymer comprises from about 25 to 85 mole percent ethylene and from about 15 to 75 mole percent of a $C_3$ to $C_8$ alpha-monoolefin.

5. A composition according to claim 1 in which said polymer comprises from about 25 to 60 mole percent ethylene and from about 40 to 75 mole percent of propylene.

6. A composition according to claim 1 in which R and R' each represent hydrogen or an aliphatic hydrocarbon radical having from 1 to 5 carbon atoms.

7. A composition according to claim 1 in which said nitrosodiphenylamine is 4-nitrosodiphenylamine.

8. A composition according to claim 1 in which said nitrosodiphenylamine is reacted with said polymer in the ratio of 0.2 to 60 parts of nitrosodiphenylamine per 100 parts said polymer.

9. A composition according to claim 8 in which 0.001 to 0.3 moles of said said nitrosodiphenylamine are reacted with one mole of said polymer.

10. A lubricating oil composition comprising a major amount of an oil of lubricating viscosity and a minor amount effective to impart viscosity index, dispersancy, and antioxidant properties to said oil of an additive composition prepared by reacting a polymer prepared from ethylene and at least one $C_3$-$C_{10}$ alpha-monoolefin and optionally a polyene selected from non-conjugated dienes and trienes comprising from about 15 to 80 mole percent of ethylene, from about 20 to 85 mole percent of said $C_3$-$C_{10}$ alpha-monoolefin and from about 0 to 15 mole percent of said polyene and having an average molecular weight ranging from about 5,000 to 500,000 with a nitrosodiphenylamine compound represented by the formula:

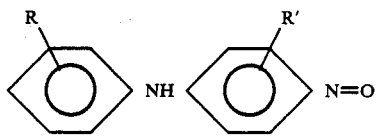

in which R and R' represent hydrogen or an organic radical having from 1 to 10 carbon atoms.

11. A composition according to claim 10 in which said polymer has an average molecular weight from about 25,000 to 250,000.

12. A composition according to claim 10 in which said polymer has an average molecular weight from about 50,000 to 150,000.

13. A lubricating oil composition according to claim 10 containing from about 0.1 to 10 weight percent of said additive composition based on the total weight of oil composition.

14. A lubricating oil composition according to claim 10 containing about 0.3 to 3.0 weight percent of said additive composition based on the total weight of oil composition.

15. A lubricating oil composition according to claim 10 in which said polymer comprises from about 15 to 75 mole percent ethylene and from about 25 to 85 mole percent of a $C_3$ to $C_8$ alpha-monoolefin and has an average molecular weight ranging from about 25,000 to 250,000.

16. A lubricating oil composition according to claim 10 wherein said backbone polymer is a copolymer of ethylene-propylene - diene terpolymer.

17. A lubricating oil composition as claimed in claim 10 wherein said backbone polymer is a copolymer of ethylene-propylene.

18. A concentrate for a lubricating oil comprising a diluent oil of lubricant (VI improver), viscosity and from about 1 to 50 weight percent of the additive composition of claim 1 based on the total weight of the concentrate.

19. A lubricating oil composition according to claim 10 containing from about 1.0 to 30 weight percent of said concentrate (VI improver) based on the total weight of oil composition.

20. A lubricating oil composition according to claim 10 containing about 3 to 15 weight percent of said concentrate (VI improver) based on the total weight of oil composition.

21. A composition according to claim 1 in which said nitrosodiphenylamine is 3-nitrosodiphenylamine.

* * * * *